United States Patent [19]
Tayag et al.

[11] Patent Number: 5,862,288
[45] Date of Patent: Jan. 19, 1999

[54] SELF-IMAGING WAVEGUIDE DEVICES FOR WAVELENGTH DIVISION MULTIPLEXING APPLICATIONS

[75] Inventors: Tristan Tayag, Catonsville, Md.; Theodore Batchman, Reno, Nev.

[73] Assignee: The United States of America as represented by the Secretary of the Army, Washington, D.C.

[21] Appl. No.: 858,193

[22] Filed: Apr. 21, 1997

[51] Int. Cl.$^6$ ............................... G02B 6/10; H04J 14/00
[52] U.S. Cl. .................. 385/129; 385/14; 385/45; 385/46; 385/28; 385/130; 385/132; 359/115; 359/124; 359/127
[58] Field of Search ................ 385/14, 15, 16, 385/17, 28, 45, 46, 129, 130, 131, 132, 147; 359/115, 121, 124, 127

[56] References Cited

U.S. PATENT DOCUMENTS

| | | | |
|---|---|---|---|
| 5,379,354 | 1/1995 | Jenkins | 385/46 |
| 5,410,625 | 4/1995 | Jenkins et al. | 385/28 |
| 5,629,992 | 5/1997 | Amersfoort et al. | 385/15 |
| 5,640,474 | 6/1997 | Tayag | 385/43 |
| 5,748,811 | 5/1998 | Amersfoort et al. | 385/15 |

*Primary Examiner*—Brian Healy
*Attorney, Agent, or Firm*—Paul S. Clohan

[57] ABSTRACT

An out-of-phase self-imaging waveguide integrated optical wavelength demultiplexer having an input waveguide containing light of two different wavelengths. The demultiplexer has a 1-by-2 self-imaging power splitter, a first intermediate waveguide containing the two wavelengths of light, a second intermediate waveguide longer than the first intermediate waveguide, a 2-by-2 self-imaging coupler having the first and second intermediate waveguides as inputs, an output waveguide containing light of one wavelength only, and an output waveguide containing light of the other wavelength only.

3 Claims, 5 Drawing Sheets

SELF-IMAGING WAVEGUIDE DEVICES FOR WAVELENGTH DIVISION MULTIPLEXING APPLICATIONS

CROSS-REFERENCE TO RELATED APPLICATIONS

The subject matter of this application is related to that disclosed in copending application Ser. No. 08/783,300 filed Jan. 10, 1997, pending.

STATEMENT REGARDING FEDERALLY SPONSORED RESEARCH OR DEVELOPMENT

Not applicable.

BACKGROUND OF THE INVENTION

This invention pertains to the field of integrated optics and photonics. Applications include optical and electronic communications, cable television, and waveguide sensing.

Integrated-optic devices are made according to photo lithographic and micro fabrication techniques. This makes possible mass production, in the same way as for electrical integrated circuits. The most common electro-optic substrate materials for integrated-optic devices are the semiconductors gallium arsenide (GaAs) and indium phosphide (InP) and lithium niobate, a ferroelectric insulating crystal. Lithium niobate is a strong, easily polished nonhydroscopic crystal, with a good electro-optic coefficient. It also has low optical transmission loss.

The emerging field of integrated optical systems has generated a number of components analogous to those employed in electronic circuits. For example, there are devices for performing beam-splitting and/or recombination functions such as those shown in U.S. Pat. No. 5,410,625. There are devices for performing optical mixing, such as those shown in U.S. Pat. No. 5,475,776. And there are devices for performing signal routing, such as those shown in U.S. Pat. No. 5,428,698.

Wavelength division (de)multiplexers for 1.3 $\mu$m and 1.5 $\mu$m are required in the field of fiber optic communications to take advantage of embedded fiber optic systems at 1.3 $\mu$m and proceed with deployment of the lower loss 1.5 $\mu$m systems. Commercially available 2-wavelength demultiplexing devices rely on bulk optical filters and therefore suffer high insertion loss and are not mass reproduceable. The use of self-imaging to perform wavelength division (de)multiplexing operations would yield several advantages over currently available wavelength division (de) multiplexers, such as: (a) low insertion loss, (b) low polarization crosstalk, (c) good wavelength separation, (d) ease in manufacture, and (e) environmental insensitivity.

BRIEF SUMMARY OF THE INVENTION

It is therefore an object of the present invention to provide a new device for performing two or more wavelength (de)multiplexing based on the self-imaging or Talbot effect in waveguides.

Still other objects and advantages of the present invention will become readily apparent to those skilled in this art from the detailed description, wherein only the preferred embodiment of the present invention is shown and described, simply by way of illustration of the best mode contemplated of carrying out the present invention. As will be realized, the present invention is capable of other and different embodiments, and its several details are capable of modifications in various obvious respects, all without departing from the present invention. Accordingly, the drawings and descriptions are to be regarded as illustrative in nature, and not as restrictive.

These and other objects are achieved by utilizing self-imaging techniques for implementing wavelength division (de)multiplexing (WDM) operations, including 2-wavelength WDM via single self-image formation for $\lambda_1$ and two self-image formation for $\lambda_2$, 2-wavelength WDM via lateral offset of the input waveguide, 2-wavelength WDM via self-imaging combined with Mach-Zehnder interferometry, and N-wavelength WDM via self-imaging combined with Mach-Zehnder interferometry.

The 2-wavelength demultiplexer, based on multiple self-image formation in the output image plane, has an input ridge waveguide located at the input object plane, containing light of wavelength $\lambda_1$ with a power level of $P_{\lambda 1}$ and light of wavelength $\lambda_2$ having a power level of $P_{\lambda 2}$. The length and width of the multimode propagation (MMP) region is designed such that it simultaneously forms a single self-image for one optical wavelength, $\lambda_1$ and two self-images for the other optical wavelength, $\lambda_2$. In this way, the two input wavelengths are demultiplexed and will exit the MMP region at output image plane through the output ridge waveguides with $\lambda_2$ split into two arms with equal powers $P_{\lambda 2}$.

The 2-wavelength demultiplexer based on a laterally offset ridge waveguide input with respect to the MMP region has an input ridge waveguide located at the input object plane containing light of wavelength $\lambda_1$ with a power level of $P_{\lambda 1}$ and light of wavelength $\lambda_2$ having a power level of $P_{\lambda 2}$, an MMP region, an output image plane, and output ridge waveguides. A lateral offset in the position of the input ridge waveguide to MMP region will result in an opposing lateral offset in the lateral position of the self-image. The device is designed to form a single self-image for $\lambda_1$. In the self-image plane, the image for $\lambda_1$ is symmetrically offset. If $\lambda_2 = 2M\lambda_1$ (for any nonzero positive integer M), $\lambda_2$ will form multiple self-images along the z-axis. In the image plane, $\lambda_2$ will therefore be laterally positioned coincident with its input position along the x-axis. In this way, the two input wavelengths $\lambda_1$ and $\lambda_2$ are demultiplexed. This device concept can be considered harmonic generation devices whose two output wavelengths are collinear.

The 2-wavelength demultiplexer based on Mach-Zehnder interference and self-imaging has the first self-imaging component being a 1-by-2 self-imaging splitter that performs an equal split for each of the two input wavelengths $\lambda_1$ and $\lambda_2$, the second self-imaging component being a 2-by-2 coupler. An optical delay or path length difference is provided by ridge waveguide optical delay lines prior to the 2-by-2 coupler such that $\lambda_1$ constructively interferes at one output of the coupler and $\lambda_2$ constructively interferes at the other output of the coupler. The design of the path length difference must include the phase shifts introduced in both the self-imaging components. This 2-wavelength demultiplexer can easily be extended to N wavelengths by using 1-by-N self-imaging splitters and N-by-N self-imaging couplers.

DETAILED DESCRIPTION OF THE INVENTION

Our invention relates to a new device for performing two or more wavelength demultiplexing based on the self-imaging (or Talbot) effect in waveguides. We will describe several device geometries each of which is fundamentally based on self-imaging in waveguides. Specific device applications include wavelength division multiplexing and demultiplexing, wavelength division multiplexing source arrays, and wavelength division multiplexing channel dropping filters.

Figure 1:
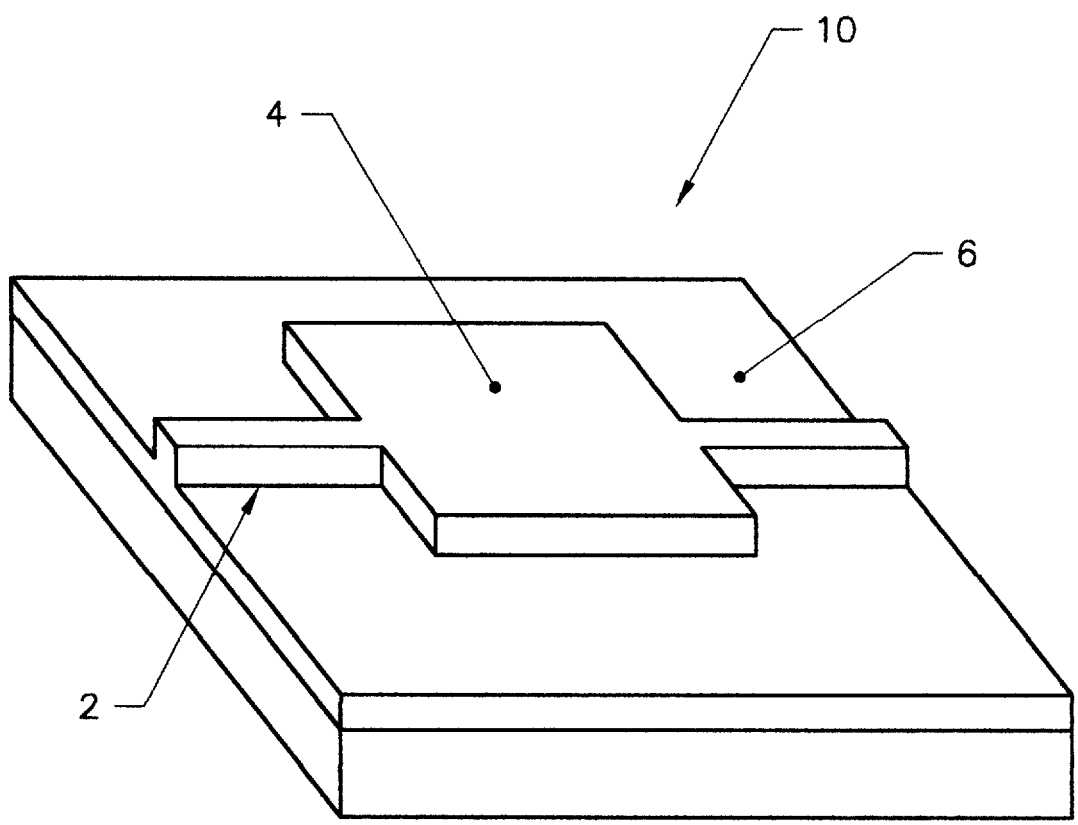
FIG. 1 is a perspective view of a waveguide 1-by-1 self-imaging device.

Shown in FIG. 1 is a self-imaging beamsplitter 10 that may be fabricated as described in jointly owned Ser. No. 08/536,909 (U.S. Pat. No. 5,640,474) which is hereby incorporated by reference. In beamsplitter 10, input ridge waveguide 2 excites multiple lateral modes supported by multimode propagation region 4, with exit at output ridge waveguide 6. Since these lateral modes travel with distinctly different phase velocities, the modes become dephased. A self-image of the input to MMP region 4 forms when the superposition of the modes in the image plane matches the original modal distribution at the input plane. This condition occurs at planes where the accumulated phase differences among the excited modes are integral multiples of $2\pi$, which allows the excited modes to constructively interfere and reproduce the input's modal distribution. MMP region 4 length from input plane to its first self-image plane is known as the first self-image distance. At fractions of this distance, multiple self images are formed. The relative phases of each of the multiple self-images is based on device dimensions and material properties.

Figure 2:
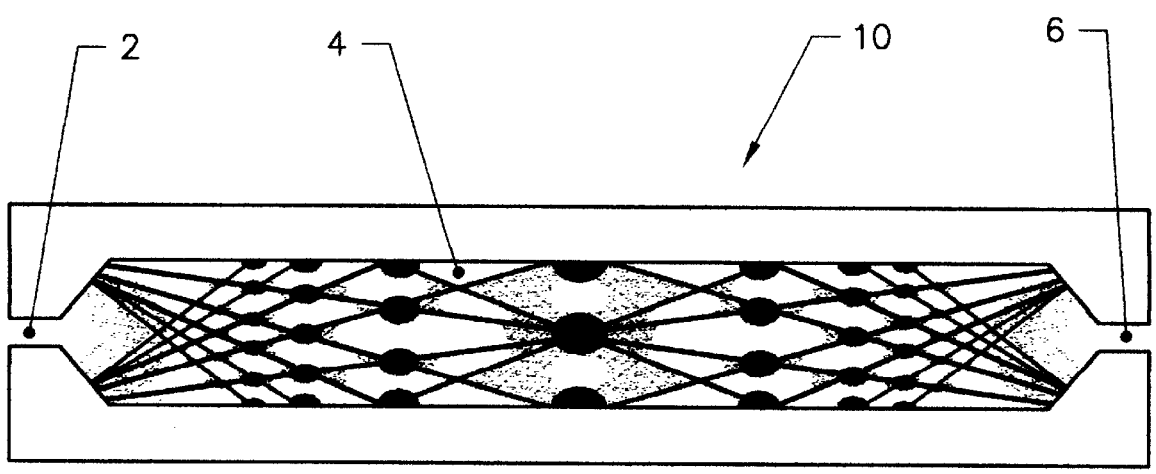
FIG. 2 is a top view of the field evolution through the multimode interference region of the 1-by-1 self-imaging device shown in FIG. 1, with the brightness at any point proportional to the amplitude of the electric field at that point.

Shown in FIG. 2 is a view of the field evolution through the self-imaging beamsplitter 10 of FIG. 1, with the grey scale at any point being proportional to the amplitude of the electric field at that point.

Figure 3:
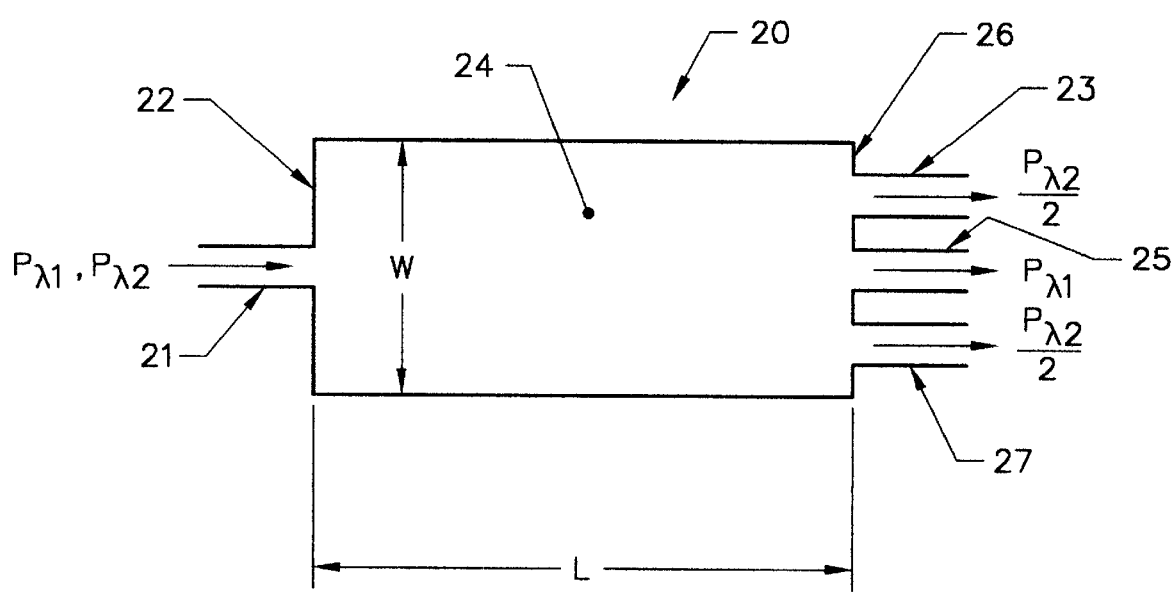
FIG. 3 is a top view of a 2-wavelength demultiplexer based on multiple self-image formation in the output image plane.

FIG. 3 illustrates one embodiment of our invention, a 2-wavelength demultiplexer 20 based on multiple self-image formation in the output image plane 26, having an input ridge waveguide 21 with an input object plane 22, containing light of wavelength $\lambda_1$ with a power level of $P_{\lambda 1}$ and light of wavelength $\lambda_2$ having a power level of $P_{\lambda 2}$. In this embodiment, length L and width W of MMP region 24 can be designed such that it simultaneously forms a single self-image for one optical wavelength, $\lambda_1$ and two self-images for the other optical wavelength, $\lambda_2$. In this way, the two input wavelengths are spatially separated (i.e., demultiplexed) and will exit MMP region 24 at output image plane 26 through output ridge waveguides 23, 25 and 27. Waveguide 25 contains light of wavelength $\lambda_1$ with a power level of $P_{\lambda 1}$ while waveguides 23 and 27 contain light of wavelength $\lambda_2$ with a power level of $P_{\lambda 2}/2$.

Figure 4:
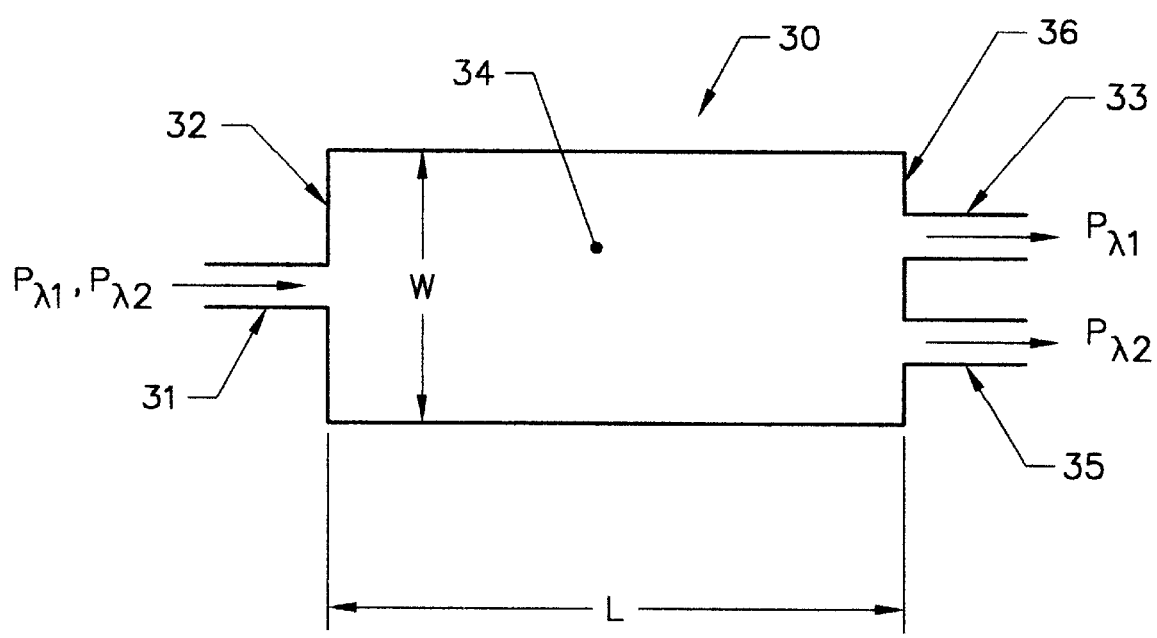
FIG. 4 is a top view of a 2-wavelength demultiplexer based on a laterally offset input with respect to the multimode propagation region.

A useful property of the self-imaging effect is that a lateral translation of the ridge waveguide input to the MMP region along the object plane results in a symmetrical translation of the self-image within the image plane. FIG. 4 illustrates a top view of a 2-wavelength demultiplexer 30 based on a laterally offset ridge waveguide input 31 with respect to MMP region 34. As in the device of FIG. 3, device 30 has an input ridge waveguide 31 with an input object plane 32, containing light of wavelength $\lambda_1$ with a power level of $P_{\lambda 1}$ and light of wavelength $\lambda_2$ having a power level of $P_{\lambda 2}$, an MMP region 34, an output image plane 36, and output ridge waveguides 33 and 35. In relationship to the 1-to-1 self-imaging device shown in FIG. 2, a lateral offset in the position of the input ridge waveguide 31 to MMP region 34 will result in an opposing lateral offset in the lateral position of the self-image. The device shown in FIG. 4 contains this lateral offset input. The device is designed to form a single self-image for $\lambda_1$. In the self-image plane, the image for $\lambda_1$ is symmetrically offset. If $\lambda_2=2M\lambda_1$ (for any nonzero positive integer M) $\lambda_2$ will form multiple self-images along the z-axis. In the image plane, $\lambda_2$ will therefore be laterally positioned coincident with its input position along the x-axis. In this way, the two input wavelengths $\lambda_1$ and $\lambda_2$ are spatially separated. This device concept can be used to separate the wavelengths of second harmonic generation devices whose two output wavelengths are collinear.

Figure 5:
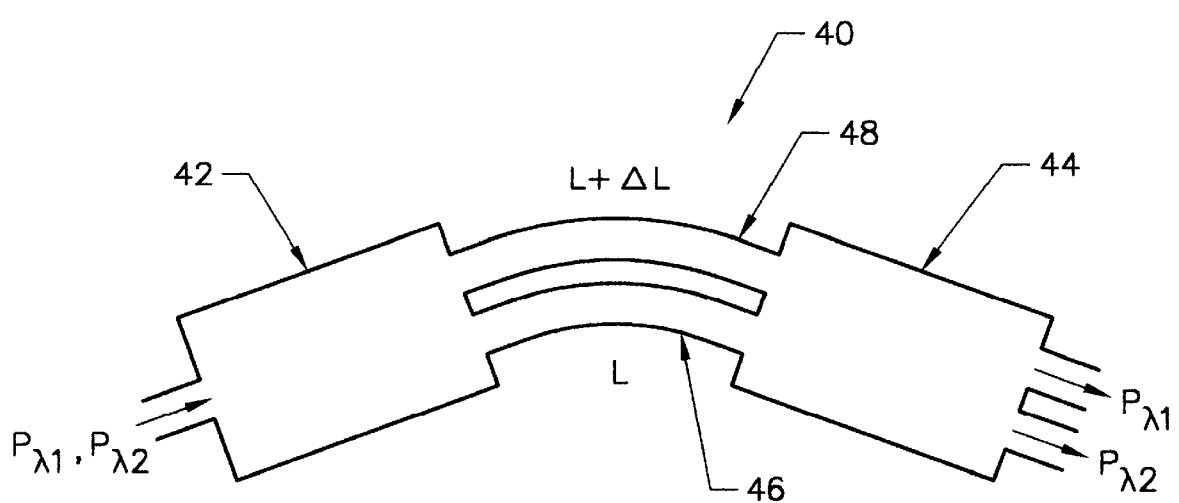
FIG. 5 is a top view of a 2-wavelength demultiplexer based on Mach-Zehnder interference and self-imaging.

By combining the self-imaging effect with waveguide delay lines, other novel WDM devices are possible. FIG. 5 is a top view of a 2-wavelength demultiplexer 40 based on Mach-Zehnder interference and self-imaging. The first self-imaging component is a 1-by-2 self-imaging splitter 42 that performs an equal split for each of the two input wavelengths $\lambda_1$ and $\lambda_2$. The second self-imaging component is a 2-by-2 coupler 44. An optical delay or path length difference is provided by ridge waveguide optical delay lines 46 and 48 prior to 2-by-2 coupler 44 such that $\lambda_1$ constructively interferes at one output of coupler 44 and $\lambda_2$ constructively interferes at the other output of coupler 44. The design of the path length difference must include the phase shifts introduced in both self-imaging components 42 and 44. This 2-wavelength demultiplexer can easily be extended to N wavelengths by using 1-by-N self-imaging splitters 42 and N-by-N self-imaging couplers 44.

It will be readily seen by one of ordinary skill in the art that the present invention fulfills all of the objects set forth above. After reading the foregoing specification, one of ordinary skill will be able to effect various changes, substitutions of equivalents and various other aspects of the present invention as broadly disclosed herein. It is therefore intended that the protection granted hereon be limited only by the definition contained in the appended claims and equivalents thereof.

Having thus shown and described what is at present considered to be the preferred embodiment of the present invention, it should be noted that the same has been made by way of illustration and not limitation. Accordingly, all modifications, alterations and changes coming within the spirit and scope of the present invention are herein meant to be included.

We claim:

1. A two wavelength self-imaging waveguide integrated optical wavelength demultiplexer comprising:

an input waveguide containing light of wavelengths $\lambda_1$ and $\lambda_2$;

a multimode interference region, with the length of said multimode interference region set such that wavelength $\lambda_1$ is singly self-imaged and wavelength $\lambda_2$ is doubly self-imaged;

a single output waveguide containing light of wavelength $\lambda_1$;

two output waveguides each containing light of wavelength $\lambda_2$; wherein said wavelength $\lambda_1$ is 1.3 $\mu$m and wavelength $\lambda_2$ is 1.5 $\mu$m.

2. An out-of-phase self-imaging waveguide integrated optical wavelength demultiplexer comprising:

an input waveguide containing light of wavelengths $\lambda_1$ and $\lambda_2$;

a 1-by-2 self-imaging power splitter;

a first intermediate waveguide containing said two wavelengths of light;

a second intermediate waveguide longer than said first intermediate waveguide containing said two wavelengths of light;

a 2-by-2 self-imaging coupler having said first and said second intermediate waveguides as inputs;

an output waveguide containing light of wavelength $\lambda_1$ only; and an output waveguide containing light of wavelength $\lambda_2$ only.

3. An out-of-phase self-imaging waveguide integrated optical wavelength demultiplexer comprising:

an input waveguide containing light of N wavelengths;

a 1-by-N self-imaging power splitter;

a set of N intermediate waveguides each containing said N wavelengths of light;

a N-by-N self-imaging coupler having said set of N intermediate waveguides as inputs;

a set of N output waveguides each containing llight of one wavelength only.

* * * * *